(12) United States Patent
Hyer et al.

(10) Patent No.: US 10,272,638 B2
(45) Date of Patent: Apr. 30, 2019

(54) SILICONE-CONTAINING ROOF ASSEMBLIES AND METHODS FOR PRODUCTION AND USE

(71) Applicant: Gardner-Gibson, Inc., Tampa, FL (US)

(72) Inventors: Sean Hyer, Tampa, FL (US); Robert Hyer, Torrance, CA (US); Amir G. Khan, Valrico, FL (US); Andrew Troxell, Tampa, FL (US)

(73) Assignee: Gardner-Gibson, Inc., Tampa, FL (US)

( * ) Notice: Subject to any disclaimer, the term of this patent is extended or adjusted under 35 U.S.C. 154(b) by 0 days.

(21) Appl. No.: 15/979,745

(22) Filed: May 15, 2018

(65) Prior Publication Data

US 2018/0257330 A1 Sep. 13, 2018

Related U.S. Application Data

(62) Division of application No. 15/095,809, filed on Apr. 11, 2016.

(51) Int. Cl.
*B32B 5/00* (2006.01)
*B32B 5/02* (2006.01)
(Continued)

(52) U.S. Cl.
CPC .................. *B32B 5/02* (2013.01); *B32B 3/02* (2013.01); *B32B 5/022* (2013.01); *B32B 7/06* (2013.01); *B32B 7/12* (2013.01); *B32B 27/06* (2013.01); *B32B 27/12* (2013.01); *B32B 27/32* (2013.01); *B32B 37/14* (2013.01); *B32B 37/24* (2013.01); *E04D 5/02* (2013.01); *E04D 5/10* (2013.01); *E04D 12/002* (2013.01); *B32B 2037/243* (2013.01); *B32B 2250/02* (2013.01); *B32B 2255/00* (2013.01); *B32B 2255/02* (2013.01); *B32B 2255/26* (2013.01);
(Continued)

(58) Field of Classification Search
None
See application file for complete search history.

(56) References Cited

U.S. PATENT DOCUMENTS 3,080,683 A * 3/1963 Sallie ........................ E04D 1/26
156/71
3,671,484 A 6/1972 Cooper et al.
(Continued)

OTHER PUBLICATIONS

Gromicko et al. "Roofing Underlayment Types" 11 pages, 2010. (Year: 2010).*

*Primary Examiner* — Robert S Loewe
(74) *Attorney, Agent, or Firm* — Greenberg Traurig, LLP (57) ABSTRACT

An underlayment material has a fiber mat partially infused and/or coated with asphalt and coated with silicone coating. A selvedge edge, may be coated or uncoated. The back of the underlayment has a self-adhesive coating, which is protected before use by a siliconized release film. The upper surface of the underlayment is coated with silicone composition providing waterproofing and radiation control. When unsaturated, the selvedge edge of fibrous material establishes a reinforced bond with an overlying sheet. When saturated with asphalt, the bond at the selvedge edge between adjacent sheets is between the asphalt layer of the selvedge edge and the adhesive on the bottom of the adjacent sheet.

9 Claims, 8 Drawing Sheets

(51) Int. Cl.
  *B32B 7/12* (2006.01)
  *B32B 27/06* (2006.01)
  *E04D 5/02* (2006.01)
  *B32B 7/06* (2019.01)
  *B32B 27/12* (2006.01)
  *B32B 27/32* (2006.01)
  *B32B 37/24* (2006.01)
  *B32B 3/02* (2006.01)
  *E04D 5/10* (2006.01)
  *E04D 12/00* (2006.01)
  *B32B 37/14* (2006.01)

(52) U.S. Cl.
  CPC ... *B32B 2260/021* (2013.01); *B32B 2260/042* (2013.01); *B32B 2262/0253* (2013.01); *B32B 2262/0276* (2013.01); *B32B 2262/101* (2013.01); *B32B 2262/14* (2013.01); *B32B 2305/72* (2013.01); *B32B 2307/50* (2013.01); *B32B 2307/54* (2013.01); *B32B 2307/582* (2013.01); *B32B 2307/718* (2013.01); *B32B 2307/72* (2013.01); *B32B 2307/748* (2013.01); *B32B 2309/105* (2013.01); *B32B 2419/00* (2013.01); *B32B 2419/06* (2013.01)

(56) References Cited

U.S. PATENT DOCUMENTS

| | | | |
|---|---|---|---|
| 3,813,280 A | 5/1974 | Olszyk et al. | |
| 3,886,021 A | 5/1975 | Breckenfelder | |
| 4,026,853 A | 5/1977 | Dressnandt et al. | |
| 4,055,453 A | 10/1977 | Tajima et al. | |
| 4,293,597 A | 10/1981 | Bessmer et al. | |
| 4,297,265 A | 10/1981 | Olsen | |
| 4,332,704 A | 6/1982 | Marzocchi et al. | |
| 4,349,388 A * | 9/1982 | Marzocchi | C03C 25/26 106/282 |
| 4,472,243 A | 9/1984 | Bondoc et al. | |
| 4,668,315 A | 5/1987 | Brady et al. | |
| 4,735,838 A * | 4/1988 | Roberts | B32B 11/04 428/40.3 |
| 4,757,652 A * | 7/1988 | Kalkanoglu | E04D 5/10 52/420 |
| 4,897,293 A | 1/1990 | Thessen | |
| 5,024,886 A | 6/1991 | Geisen et al. | |
| 5,195,290 A | 3/1993 | Hulett | |
| 5,206,068 A * | 4/1993 | Kalkanoglu | D06N 5/00 428/141 |
| 5,240,760 A | 8/1993 | George et al. | |
| 5,338,783 A | 8/1994 | Olsen | |
| 5,456,785 A * | 10/1995 | Venable | B08B 1/04 156/229 |
| 5,545,682 A | 8/1996 | Kaiya et al. | |
| 5,744,229 A * | 4/1998 | Gleason | B29C 70/12 428/297.4 |
| 6,296,732 B1 | 10/2001 | Enlow et al. | |
| 6,336,988 B1 | 1/2002 | Enlow et al. | |
| 6,399,678 B2 | 6/2002 | Frankoski et al. | |
| 6,764,733 B1 * | 7/2004 | Clarke | B32B 27/12 428/40.3 |
| 6,817,152 B2 | 11/2004 | Peng et al. | |
| 6,851,240 B2 | 2/2005 | Peng et al. | |
| 6,993,876 B1 * | 2/2006 | Peng | B32B 17/067 428/505 |
| 7,234,284 B2 | 6/2007 | Paradise et al. | |
| 8,061,098 B2 | 11/2011 | Whelan et al. | |
| 8,277,881 B2 * | 10/2012 | Khan | C09D 5/004 427/186 |
| 8,397,446 B2 | 3/2013 | Kalkanoglu et al. | |
| 9,631,094 B2 | 4/2017 | Rotz et al. | |
| 9,970,153 B2 * | 5/2018 | Deng | B32B 17/02 |
| 2002/0076525 A1 * | 6/2002 | Fensel | C08L 95/00 428/150 |
| 2003/0203145 A1 | 10/2003 | Zanchetta et al. | |
| 2006/0185298 A1 | 8/2006 | DeJamette et al. | |
| 2008/0104917 A1 * | 5/2008 | Whelan | C09J 7/29 52/408 |
| 2010/0119784 A1 * | 5/2010 | Zickell | E04D 5/02 428/193 |
| 2010/0130080 A1 * | 5/2010 | Coninx | C09D 175/04 442/1 |
| 2011/0159300 A1 | 6/2011 | Rokowski et al. | |
| 2013/0142949 A1 | 6/2013 | Khudyakov et al. | |
| 2015/0240496 A1 | 8/2015 | Grubka et al. | |
| 2017/0058528 A1 | 3/2017 | Verhoff et al. | |
| 2017/0158440 A1 | 6/2017 | Belt et al. | |

* cited by examiner

FIG. 18

SILICONE-CONTAINING ROOF ASSEMBLIES AND METHODS FOR PRODUCTION AND USE

CROSS REFERENCES TO RELATED APPLICATIONS

This application is a divisional application of U.S. Non-Provisional application Ser. No. 15/095,809, filed on Apr. 11, 2016, entitled "Silicone-Containing Roof Assemblies and Methods for Production and Use," the entirety of which is incorporated herein by reference.

FIELD

The present invention relates to roofing materials, and more particularly, to a roofing material that may be used as underlayment for exterior roofing layers, such as ceramic tiles, wood shakes, metal, slate or asphalt shingles or as the exterior layer itself.

BACKGROUND

Roofing materials need to be waterproof and are frequently used in multiple layers to convey a redundant water barrier. Underlayment materials are known which are applied to roof decking to provide a first layer of waterproofing. Additional roofing layers, such as roofing tiles, shingles, or asphalt roll roofing are then applied over the underlayment in order to increase the weather resistance of the roof and to achieve aesthetic effects. While various types of underlayment and finish roofing layers are known, additional alternatives remain desirable.

SUMMARY

The disclosed subject matter relates to a method for making a building material, comprising the steps of providing a web of support material in a roll; withdrawing the support material from the roll; coating the support material with a silicone material; curing the silicone material to a non-tacky condition; winding the coated support material on a take-up roll.

In another embodiment, the silicone material is water-curable and the step of curing includes applying water to the silicone material.

In another embodiment, further including the step of allowing the water to remain in contact with the silicone material for a period of time that initiates curing.

In another embodiment, further including the step of removing the water from the silicone material after initiation of curing.

In another embodiment, further including the step of adding a catalyst to the silicone material to increase the rate of curing.

In another embodiment, the catalyst is an organo-metallic compound.

In another embodiment, the catalyst is dibutylin dilaurate present in a concentration of 0.1 to 1.0% by weight in the silicone material.

In another embodiment, the silicone material is applied at a thickness in the range of 0.1 mm to 2 mm.

In another embodiment, the silicone material has a viscosity in the range of 1,000 to 20,000 cps during the step of applying.

In another embodiment, further including the step of applying a modified asphalt to the support material prior to the step of coating with the silicone coating.

In another embodiment, the modified asphalt is imbedded into the support material by dip-saturation or squeezing prior to the step of coating with the silicone material.

In another embodiment, the modified asphalt is applied to an upper surface of the support material.

In another embodiment, further including the step of applying an adhesive to a bottom surface of the support material.

In another embodiment, further including the step of forming a selvedge edge by scraping modified asphalt from a portion of the support material.

In another embodiment, further including the step of applying a release sheet to the adhesive applied to the bottom surface.

In another embodiment, the silicone material is applied to a portion of the support material leaving a selvedge edge uncoated.

In another embodiment, further including the step of applying an adhesive to a selvedge edge of the support material.

In another embodiment, further including the step of applying a release sheet over the adhesive on the selvedge edge.

In another embodiment, the silicone material is first prepared in an atmosphere of nitrogen prior to the step of applying the silicone coating.

In another embodiment, the step of applying and curing are conducted on a roll line that advances at a rate of about 50 to 300 feet per minute.

In another embodiment, the curing occurs within 10 minutes.

In another embodiment, the step of applying water is by misting with a spray conducted in less than 10 minutes.

In another embodiment, the step of removing water is conducted by blowing air on the building material.

In another embodiment, a building material with an upper surface and a lower surface has a support web at least partially infused with asphalt; a layer of silicone material applied to at least one of the support web or the asphalt, covering at least a portion of the upper surface and defining a selvedge edge on the upper surface that is not covered by the silicone material.

In another embodiment, the asphalt is modified and contains at least one of SBS, APP, SIS, SEB, SEBS or a combination of homo, block or co-polymers.

In another embodiment, further including a layer of adhesive applied to a bottom surface.

In another embodiment, further including a release sheet removably covering the adhesive on the bottom surface.

In another embodiment, the support web is made from a fibrous material.

In another embodiment, the fibrous material includes at least one of polyester, fiberglass, a combination of fiberglass and polyester, asphalt saturated felt-paper, Polypropylene, Polyethylene, or a combination of Polypropylene and Polyethylene.

In another embodiment, the building material has a weight per square foot in the range of 0.1 to 1.0 lbs./ft$^2$.

In another embodiment, the building material has a weight per square foot in the range of 0.1 to 0.55 lbs./ft$^2$.

In another embodiment, the building material has the following properties: tensile strength MD/CD (psi) 66/30; elongation MD/CD (%) 226/275; density of about 0.971 bs/yard²; tear strength MD/CD (psi) of 55/85 and adhesion to plywood(plf)) of about 28.

In another embodiment, the method includes applying a modified asphalt to the support material after the step of coating with the silicone coating.

In another embodiment, the asphalt in the building material is un-modified.

BRIEF DESCRIPTION OF THE DRAWINGS

For a more complete understanding of the present disclosure, reference is made to the following detailed description of exemplary embodiments considered in conjunction with the accompanying drawings.

DETAILED DESCRIPTION OF EXEMPLARY EMBODIMENTS

Figure 1:
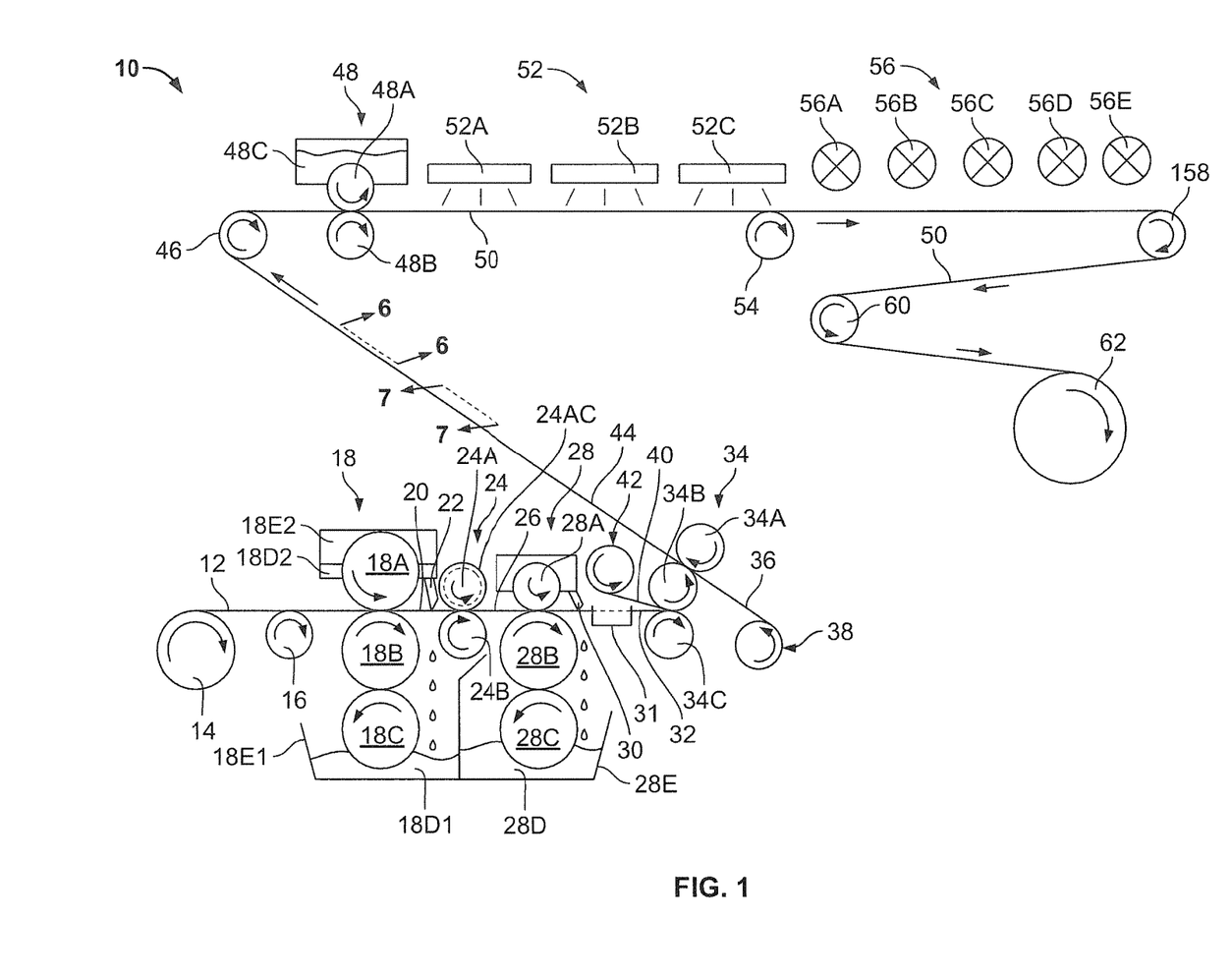
FIG. 1 is diagrammatic view of an apparatus and process for making a roofing underlayment material in accordance with an embodiment of the present disclosure.

FIG. 1 shows a manufacturing line 10 for making an underlayment material 50 in accordance with an embodiment of the present disclosure. A woven or felted polyester mat 12, having an initial thickness of about 0.5 mm to 1.6 mm or, in one embodiment, 0.8 mm-1.2 mm, and a density of about 40 g/m² to 250 g/m² or, in one embodiment, 120 g/m² to 190 g/m² and a width of about 32 in to 42 in or, in one embodiment, 1 m to 36 in, is withdrawn from a supply roll 14 by the action of one or more rolls 16, 18A, 18B, 24A, 24B, 28A, 28B, 34A, 34B, 34C, 46, 48A, 48B, 54, 58, 60, 62, which may be driven by an electric motor or the like, and/or turned by the passage of the mat 12 passing there over. Some or all of the rolls 16, 18A, 18B, 24A, 24B, 28A, 28B, 34A, 34B, 34C, 48A, 48B, etc., may be free-wheeling. Rolls, such as support rolls 16 and 54 may be used to support the mat 12 as it travels a distance to the next set of rolls, e.g., 18A, 18B. Rolls 46, 58 and 60 may be used to change the direction of the mat 12, induce advancement of the mat 12 and/or provide tensioning. In addition to rolls, e.g., 16, support belts, tables, etc. may also be used in guiding, supporting and handling the mat 12, both at the initial stage and at later stages.

Figure 2:
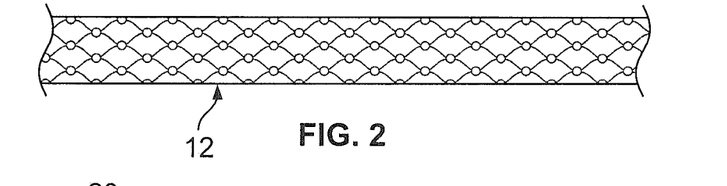
FIG. 2 is a diagrammatic cross-sectional view of a mat component of an underlayment material in accordance with an embodiment of the present disclosure.

FIG. 2 shows a cross-sectional view of the mat 12, which may be obtained from Johns Manville of Denver, Colo., USA as products identified as spunbond/needle punched and/or glass reinforced mat, or from a variety of other sources. As an alternative to polyester, the mat 12 may be made from other materials, such as fiberglass, a combination of fiberglass and polyester, asphalt saturated felt-paper, polypropylene, polyethylene, or a combination of polypropylene and polyethylene. FIGS. 2-6 are cross sections from the same perspective, i.e., cutting through the reflective element in a direction parallel to its direction of advancement and looking perpendicular to the direction of advancement (into the page.) The same can be said of FIG. 10-14.

Referring back to FIG. 1, after withdrawal from the supply roll 14, the mat 12 passes to a styrene butadiene styrene (SBS) modified asphalt coating station 18 having coating rolls 18A, 18B, 18C, the latter of which rotates in liquefied coating 18D1 held in reservoir 18E1 and then with roll 18B passes the SBS modified asphalt coating 18D1 to the bottom surface of the mat 12. The upper surface may also optionally be coated by roll 18A which is fed a supply of coating 18D2 by reservoir 18E2. The SBS modified asphalt coating is of a type that is well known in the industry and may be obtained commercially or may be produced on site. The SBS modified asphalt coating 18D1 is kept in a liquid state by maintaining it at a temperature of about 325-380° F.

Figure 3:
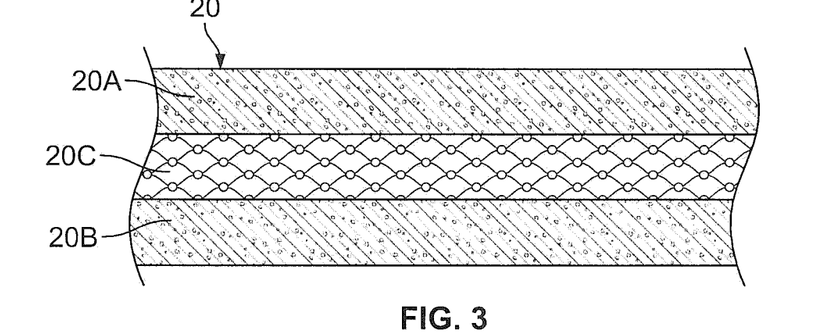
FIG. 3 is a diagrammatic cross-sectional view of a coated mat component of a underlayment material in accordance with an embodiment of the present disclosure.
Figure 4:
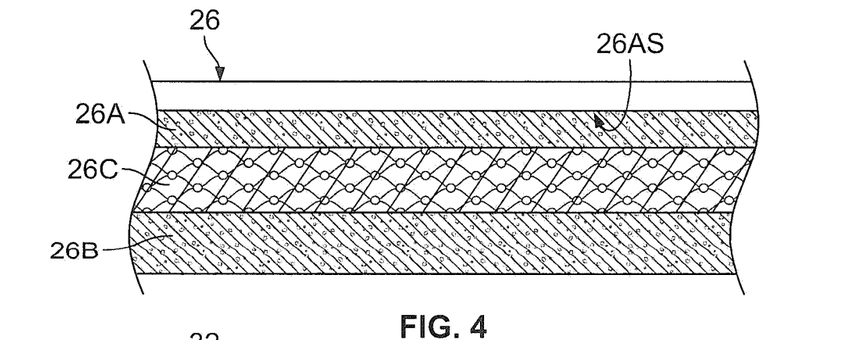
FIG. 4 is a diagrammatic cross-sectional view of a coated mat component of a underlayment material with infused mat and selvedge edge in accordance with an embodiment of the present disclosure.

FIG. 3 shows the SBS modified asphalt coated mat 20 in cross-section and having three layers: an optional upper layer of SBS modified asphalt coating 20A having an applied thickness of about 0 mm to 2 mm, in one embodiment, 0.3 mm to 0.5 mm, a lower layer of SBS modified asphalt coating 20B with an applied thickness of about 0.1 mm to 2 mm, in one embodiment, 0.3 mm to 0.5 mm, and middle mat layer 20C about 0.5 mm to 1.6 mm, in one embodiment, 0.8 mm to 1.2 mm thick. Referring to FIG. 1, a doctor blade 22 may optionally be used to scrape a portion of the SBS modified asphalt upper layer 20A (FIG. 3), e.g., of a width of about 3 inches to 3.5 inches and a depth of about 0.3 mm to 0.5 mm to form a selvedge edge 26AS, as shown in FIG. 4. The applied SBS coating layer(s) 20B and optionally 20A, when hot, wick into the mat layer 20C and the volume of SBS necessary to saturate the mat layer 20C may be adjusted by adjusting the applied thickness, Referring to FIG. 1, a compression station 24 with an upper roll 24A and a lower roll 24B may be utilized to squeeze the SBS upper and lower coatings 20A, 20B into the mat layer 20C and/or to reduce the thickness of the coated mat 20 (FIG. 3) to a desired thickness, producing the compressed, coated mat 26 (FIG. 4). As the SBS cools, it is retained in the middle mat layer 20C and the coated mat 26 exhibits dimensional stability. In one example, the compressed mat 26 has an upper SBS layer 26A of about 0 mm to 2 mm, in one embodiment, 0.3 mm to 0.5 mm in thickness, a selvedge edge 26AS of about 0 mm to 2 mm, in one embodiment, 0.3 mm to 0.5 mm thickness, a lower SBS layer 26B of about 0.1 mm to 2 mm, in one embodiment, 0.3 mm to 0.5 mm, in thickness and an SBS infused mat middle layer 26C of about 0.5 mm to 1.6 mm, in one embodiment, 0.8 mm to 1.2 mm in thickness, such that the total thickness of the compressed mat 26 when measured at the thickest part is about 1.5 to 2.5 mm. When additional layers, e.g., of adhesive and release film are added, as described below, the total thickness will increase, in one example to about 2 to 3. 5 mm thickness depending upon where the measurement is made, e.g., at or beyond the selvedge edge 26AS. These dimensions are merely exemplary and may be varied considerably, e.g., depending upon the strength and weight that is desired/required in the final underlayment product 50. For example, underlayment that is subjected to severe weather may need to be significantly thicker and stronger than that which is used in mild climates. In addition, a range of qualities are generally offered having varying useful lifetimes and warranties. Weight limitations and preferences pertaining to ease of transporting material to a roof may also play a part in matching the dimensions of the underlayment 50 to given needs or preferences of the consumer. In light of these factors, the total thickness of the underlayment product may vary widely.

Referring to FIG. 1, the upper roll 24A may optionally have a cylindrical portion 24AC of greater radius to insure that the selvedge edge 26AS is rolled to a consistent and smooth thickness that is less than the thickness of the remainder of the compressed mat 26. An adhesive applying station 28 with applying rolls 28A (optional), 28B, 28C and optional doctor blade(s) 30 (only one shown) may be used to apply self-adhering adhesive (SA) 28D held in reservoir 28E to the compressed mat 26, yielding an adhesive coated web 32. The adhesive 28D may be prepared on-site by combining SBS rubber and asphalt or may be obtained commercially from a variety of sources, e.g., from Crafco, Inc. of Chandler, Ariz. A filler may be added to increase durability. In one exemplary embodiment, the adhesive will have the following weight percentages: about 4% to 8% SBS rubber, about 50% to 60% asphalt of the 150-200 pen type and about 15% to 25% filler in the form of calcium carbonate/limestone.

Figure 5:
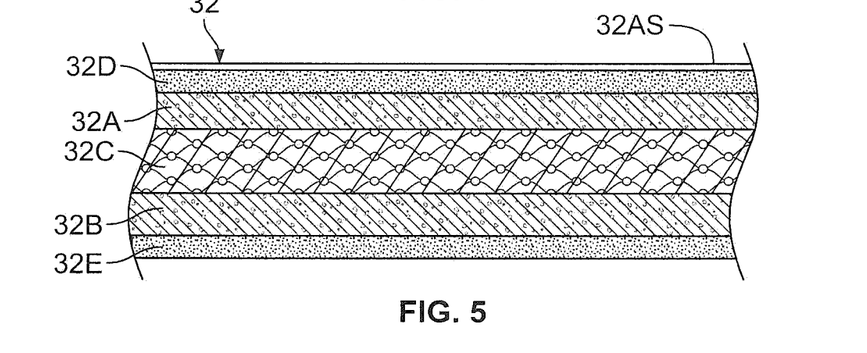
FIG. 5 is a diagrammatic cross-sectional view of the coated mat component of FIG. 4 with adhesive layers applied in accordance with an embodiment of the present disclosure.

FIG. 5 shows the adhesive coated web 32 having an upper layer 32A with selvedge edge 32AS, a lower layer 32B, an infused middle layer 32C, an adhesive layer 32D on selvedge edge 32AS and a bottom adhesive layer 32E. It should be appreciated that the optional adhesive 32D on the upper side of the adhesive coated mat 32 would be applied only to the selvedge edge 32AS and that the bottom layer of adhesive 32E may cover the entire bottom surface of the adhesive coated web 32.

Figure 6:
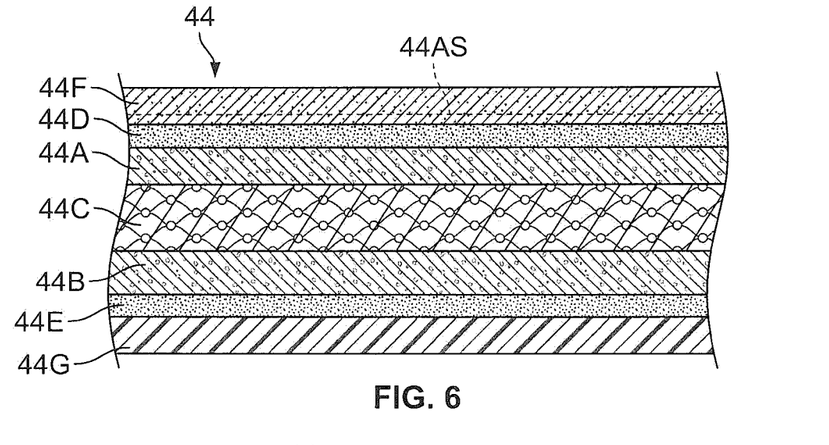
FIGS. 6 and 7 are diagrammatic cross-sectional views taken of the coated mat component of FIG. 1 along section lines 6-6 and 7-8 of FIG. 1, respectively and looking in the direction of the arrows, with adhesive layers covered by release sheets applied in accordance with an embodiment of the present disclosure.
Figure 7:
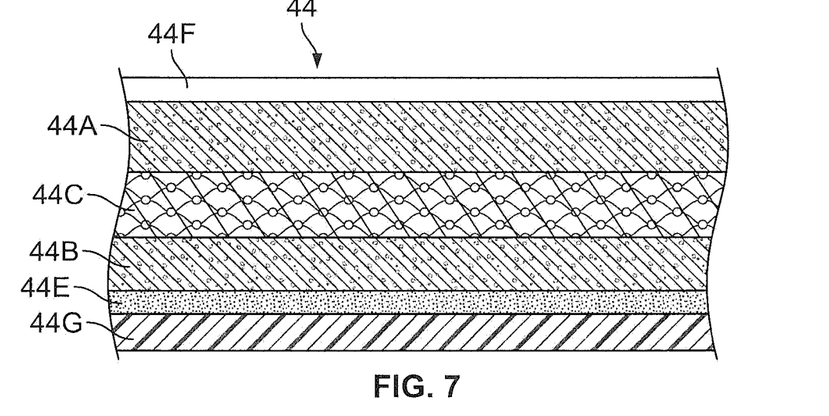

Referring to FIG. 1, after application of the adhesive layer 32E and optionally adhesive layer 32D, the adhesive coated web 32 may be cooled by a cooling station 31, such as a water bath. A release film application station 34 with application rolls 34A, 34B, 34C (optional) may be used to apply a split, siliconized, polyethylene bottom release film 36 of about 1.0 to 1.5 mm in thickness to cover the bottom adhesive layer 32E. Such film is available commercially from a variety of sources, e.g., Integrated Films of Atlanta, Ga. and is deployed from a bottom film roll 38 and drawn with the adhesive coated mat 32 between the rolls 34A, 34B. A siliconized, polyethylene selvedge edge release film 40 drawn from selvedge edge film roll 42 may optionally be similarly applied over the adhesive layer 32 D on the selvedge edge 32AS and pressed into position by rolls 34B, 34C, producing protected, self-adhesive web 44. If the selvedge edge 32AS is coated with an adhesive, the release film 36 on the bottom of the adhesive coated mat 32 will prevent the selvedge edge 32AS from sticking to other parts of the mat 32 when the mat 32 is rolled and a release sheet is typically not required to cover the selvedge edge 32AS, however, for purposes of preserving the cleanliness and flatness of the selvedge edge, a release sheet may be used. As shown in FIGS. 6 and 7, the protected, self adhesive web 44 has an upper layer 44A, a selvedge edge 44AS, a lower layer 44B, an infused middle layer 44C, an adhesive layer 44D (optional) on the selvedge edge 44AS, a bottom adhesive layer 44E, a release film 44F (optional) on the selvedge edge 44AS adhesive layer 44D and a bottom release film 44G covering bottom adhesive layer 44E.

Referring to FIG. 1, the protected, self-adhesive web 44 optionally passes over a support/direction change roll 46 and into a silicone coating station 48 with an upper coating roll 48A and a lower support roll 48B that applies a silicone coating 48C on the top of the web 44 to yield a silicone coated web 50. The silicone coating 48C may be prepared starting with a commercially available moisture—curable silicone coating, such as Eterna-Kote S-100 Silicone Roof Coating available from Sun Paints and Coatings Inc. of Clearwater, Fla. or another comparable, commercially available coating. The silicone coating is of a type that is moisture curable within a relatively fast curing time, e.g., 2 to 4 hours at 50% humidity, with full cure occurring in 24 to 48 hours at 50% humidity. In accordance with an aspect of the present disclosure, the commercially available silicone coating is modified by: 1) adding a quantity of catalyst of the organometallic compound type, e.g., dibutyltin dilaurate, in an amount of 0.1% to 1% by weight to allow curing of an applied layer of the silicone coating in a timeframe consistent with use on a fast-paced commercial production line using the methods and apparatus disclosed below. The viscosity is also adjusted to permit efficient application by the methods described below.

Preparation of the Silicone Coating

A silicone coating made in accordance with the foregoing formula may be made by the mixing in a vacuum mixer and packaged. Optionally, the mixing and packaging may be conducted in a nitrogen atmosphere or other dry atmosphere to reduce moisture exposure.

Use/Application of the Silicone Coating

Figure 8:
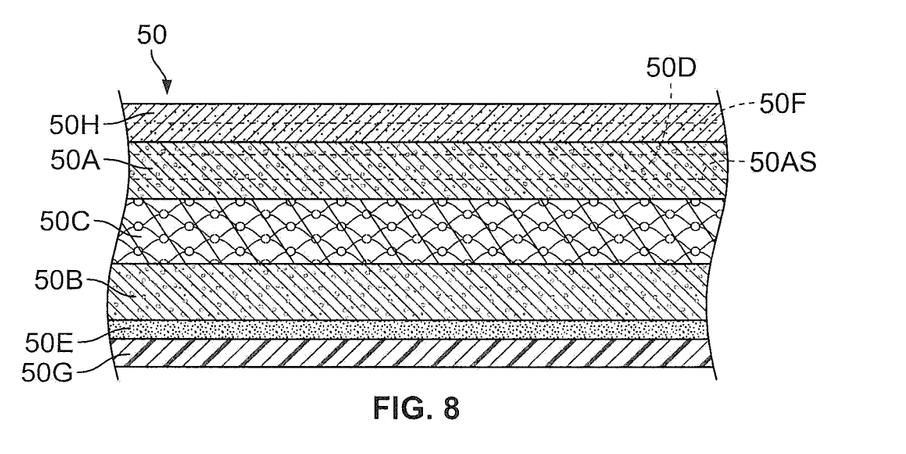
FIG. 8 is a diagrammatic cross-sectional view of the coated mat component of FIGS. 6 and 7 with a layer of silicone material applied in accordance with an embodiment of the present disclosure.

The silicone coating which has a viscosity adjusted to the range of 1,000 to 20,000 cps in one embodiment and 4,000 cps to 6,000 cps in another embodiment, volatile organic compound content (VOC) of <10 (g/L) may be applied by roller coating, spraying, slot dye extrusion, electrostatic coating, etc. to form a layer of about 0.1 mm to 6 mm, in one embodiment, about 0.1 mm to 2.0 mm thick in another embodiment and 0.3 mm to 2 mm, thick in another embodiment on the coated web 50. A doctor blade (not shown) may be utilized to assure the thickness, evenness and flatness of the silicone coating layer 50H (FIG. 8).

Properties of the Silicone Coating and the Properties of the Underlayment Material When prepared/modified, applied and cured as described herein, the silicone coating and underlayment material 50 has the following properties.

Silicone Coating

| Property | value |
| --- | --- |
| Density (lbs/gal) | 11.1 |
| Low Temp Flex (−20° C.) | Pass |
| Elongation (%) | 300 |
| Tensile Strength (PSI) | 450 |
| Shore Hardness A | 55 |
| Solids (%) | 100% |

Underlayment Material

| Property | value |
| --- | --- |
| Tensile MD/CD (psi) | 66/30 |
| Elongation MD/CD (%) | 226/275 |
| Density (lbs/yrd$^2$) | 0.977 |
| Tear MD/CD (psi) | 55/85 |
| Adhesion to Plywood (plf) | 28 |

The silicone coating 48C (FIG. 1) is applied only to the upper surface of the protected, self-adhesive web 44 (FIGS. 6 and 7) and preferably not on the selvedge edge 44AS. As shown in FIG. 1, an atomizer station 52 with one or more atomizers 52A, 52B, 52C are utilized to spray a mist of water on the web 50 on top of the applied layer of silicone coating 48C. In accordance with one example, a suitable atomizer may be commercially obtained from Exair under the brand name, Internal Mix Flat Fan Atomizing Nozzles. The atomizers 52A, 52B, 52C mist the silicone coating 48C applied to the web 50 with water in order to speed up the curing reaction of the coating. The curing reaction (polymerization) is catalyzed by water, so therefore a fine water spray is effective at inducing an even and complete cure of the coating 48C. One or more support rolls 54, belts or other support mechanism(s) maintains the position of the silicone coated web 50 relative to the atomizers 52A-C and relative to a drying/cooling station 56 with one or more fans 56A-E. The fans 56A-E will be used to evaporate any remaining moisture after the coating curing reaction has been completed. Optionally, an air knife may be used to drive water off the web 50.

Additional support/redirecting rolls 58, 60 may be used to adjust the length of the run of the silicone coated web 50 to allow curing of the silicone coating and to deliver the web to a take-up roll/winder 62. Is should be appreciated that the system 10 of FIG. 1 is not to scale and that the distances between elements 14, 18, 24, 28 . . . 62 would be of a different scale that that shown. In one example, the web 12 path includes passing through the SBS modified asphalt saturating station 18, the compression station 24, the adhesive applying station 28, the cooling station 31 and continuing on to the release film application station 34. Following this, the web moves to the silicone coating station 48. The distance from the silicone coating station 48 to the atomizer station 52 is a short distance, e.g., from about 2 to 3 feet to allow the water mist time to cure the silicone coating 48C. In one embodiment, the atomizer station 52 is about 6 to 8 feet long. Given a line speed of about 50-300 ft. per minute, in one example, it can be seen that the coating is misted within about 1 to 5 seconds after being applied to the silicone coated web 50 and for a duration of about 5 to 10 seconds. This misting results in rapid curing of the coating, e.g., in less than 100 seconds, or in a line distance of less than 500 ft. at a line speed of 300 ft./min or less than 160 ft. at a line speed of 100 ft./min. In another embodiment, misting is accomplished in less than 10 minutes and the line speed may be adjusted to allow curing within a longer period of time, e.g., 10 minutes or less. The silicone coated web 50 is then driven into the cooling/drying section 56. In this manner, the present disclosure illustrates how a silicone coated web 50 can be produced in a high speed (100 to 300 feet per minute) manufacturing environment.

FIG. 8 shows the silicone coated web 50 in cross-section from the same perspective as FIG. 7 and featuring an upper layer 50A, a lower layer 50B, an infused middle layer 50C, a bottom adhesive layer 50E, a release sheet 50F (shown by a dotted line) on the adhesive layer 50D (shown by a dotted line) on the selvedge edge 50AS (shown by a dotted line), a bottom release film 50G covering bottom adhesive layer 50E and a silicone coating layer 50H. It should be understood that the thickness of the layers in FIGS. 2-8 and 10-15 are not to scale and are diagrammatic only.

Figure 9:
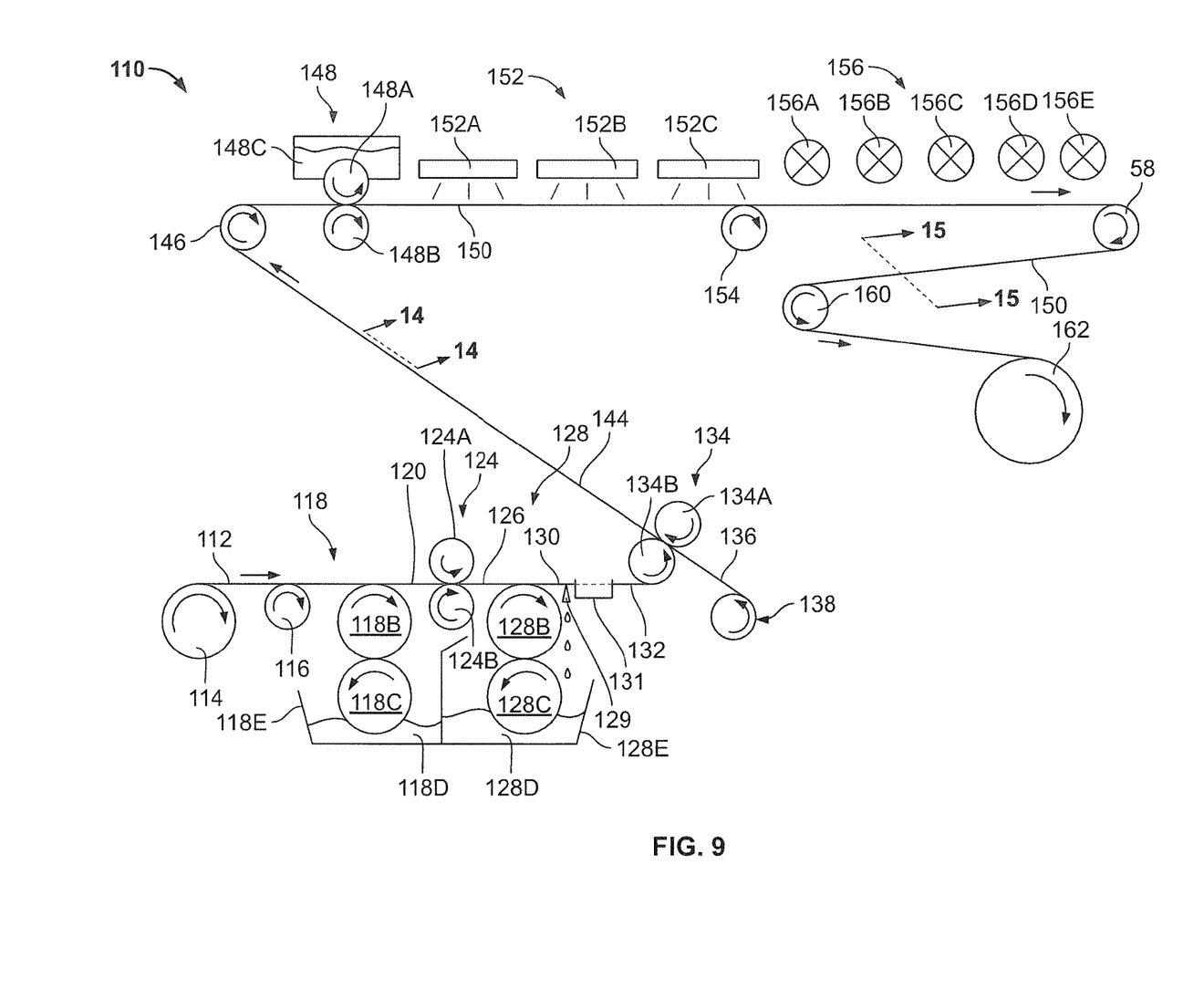
FIG. 9 is diagrammatic view of an apparatus and process for making a roofing underlayment material in accordance with an alternative embodiment of the present disclosure.

FIG. 9 shows a manufacturing line 110 for making an underlayment material 150 in accordance with an alternative embodiment of the present disclosure. A woven or felted polyester mat 112, having an initial thickness of about 0.5 to 1.6 mm or, in one embodiment, 0.8 mm to 1.2 mm, and a density of about 40 g/m$^2$ to 250 g/m$^2$ or, in one embodiment, 120 g/m$^2$ to 190 g/m$^2$' and a width of about 32 in to 42 in or, in one embodiment, 1 m to 36 in., is withdrawn from a supply roll 114 by the action of one or more rolls 116, 118B, 124A, 124B, 128B, 134A, 134B, 146, 148A, 148B, 154, 158, 160, 162, which may be driven by an electric motor or the like, and/or turned by the passage of the mat 112 passing there over. Some or all of the rolls 116, 118A, 118B, 124A, 124B, 134A, 134B, 148A, 148B, etc., may be free-wheeling. Rolls, such as support rolls 116 and 154, may be used to support the mat 112 as it travels a distance to the next set of rolls, e.g., 118B. Rolls 146, 158 and 160 may be used to change the direction of the mat 112, induce advancement of the mat 112 and/or provide tensioning. In addition to rolls, e.g., 116, support belts, tables, etc. may also be used in guiding, supporting and handling the mat 112, both at the initial stage and at later stages.

Figure 10:
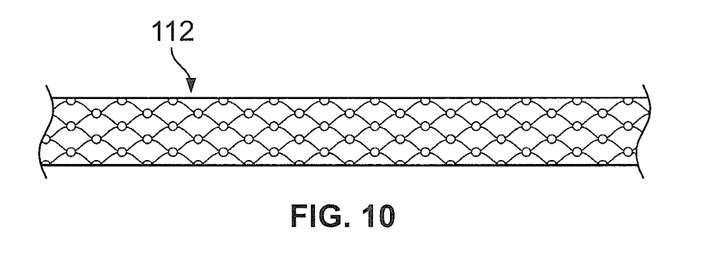
FIG. 10 is a diagrammatic cross-sectional view of a mat component of an underlayment material in accordance with an embodiment of the present disclosure.

FIG. 10 shows a cross-sectional view of the mat 112, which is essentially the same as that depicted in FIG. 2 and which may be obtained from Johns Manville of Denver, Colo., USA as products identified as spunbond/needle punched and/or glass reinforced mat, or from a variety of other sources. As an alternative to polyester, the mat 112 may be made from other materials, such as fiberglass, a combination of fiberglass and polyester, asphalt saturated felt-paper, polypropylene, polyethylene, or a combination of polypropylene and polyethylene.

Referring back to FIG. 9, after withdrawal from the supply roll 114, the mat 112 passes to a styrene butadiene styrene (SBS) modified asphalt coating station 118 having coating rolls 118B, 118C, the latter of which rotates in liquefied coating 118D held in reservoir 118E and then with roll 118B passes the SBS modified asphalt coating 118D to the bottom surface of the mat 112. In this embodiment, the upper surface of the mat 112 is not coated with SBS. The SBS modified asphalt coating is of a type that is well known in the industry and may be obtained commercially, e.g., from Crafco, Inc. of Chandler, Ariz. or may be produced on site. The SBS modified asphalt coating 118D is kept in a flowable state by maintaining it at a temperature of about 325-380° F.

Figure 11:
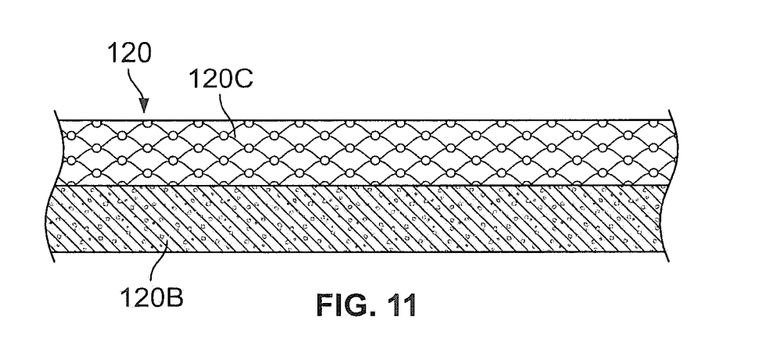
FIG. 11 is a diagrammatic cross-sectional view of a coated mat component of a underlayment material in accordance with an embodiment of the present disclosure.

FIG. 11 shows the SBS modified asphalt coated mat 120 in cross-section and having two layers: a lower layer 120B of SBS modified asphalt coating with an applied thickness of about 0 mm to 2 mm, in one embodiment, 0.3 mm to 0.5 mm, and mat layer 120C about 0.5 mm to 1.6 mm, in one embodiment, 0.8 mm to 1.2 mm, thick. The applied SBS coating layer 120B is flowable when hot, and can wick into the mat layer 120C. If the viscosity of the SBS coating layer 120B is thin enough, attributable to temperature and composition, it may infuse into the mat layer 120C upon application. The volume of SBS necessary to saturate the mat layer 120C to the desired extent may be adjusted by adjusting the applied thickness. In this embodiment, the mat layer 120C may optionally be less than fully saturated, such that an upper portion thereof is left unsaturated with SBS, as shall be further described below.

Figure 12:
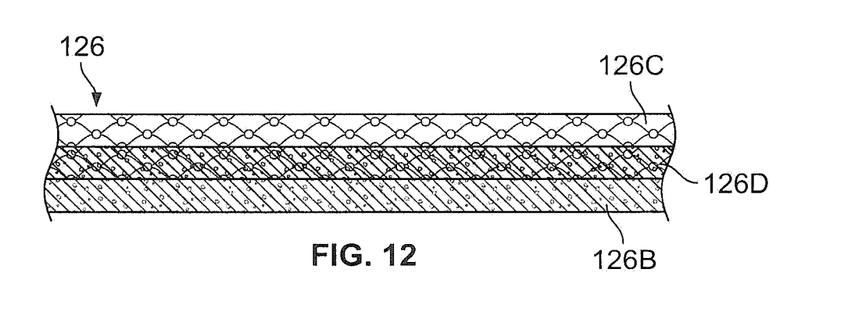
FIG. 12 is a diagrammatic cross-sectional view of a coated mat component of a underlayment material with partially infused mat in accordance with an embodiment of the present disclosure.

Referring to FIG. 9, a compression station 124 with an upper roll 124A and a lower roll 124B may be utilized to squeeze the SBS lower coating 120B into the mat layer 120C to a selected extent and/or to reduce the thickness of the SBS coated/infused mat 120 (FIG. 11) to a desired thickness, producing the compressed, coated mat 126 (FIG. 12). The compressed coated mat 126 features an upper un-infused layer 126C of mat without SBS, a middle layer 126D of mat saturated with SBS and a lower layer 126B of SBS that has not been absorbed into the mat 112 (FIG. 10). The lower layer 126B may have various thicknesses ranging from 0.1 mm to 2 mm, in one embodiment, 0.3 mm to 0.5 mm, and may have effectively zero thickness if the entire applied coating of SBS 120B (FIG. 11) is infused/pressed into the mat 112 (FIG. 10) to form the middle layer 126D (FIG. 12). As the SBS cools, it is retained in the mat layer 126D and the coated mat 126 thereafter exhibits dimensional stability. In one example, the compressed mat 126 has an upper un-infused mat layer 126C about 0 mm to 2 mm, in one embodiment, 0.3 mm to 0.5 mm in thickness, a center infused mat layer 126D about 0.5 mm to 1.6 mm, in one embodiment, 0.8 mm to 1.6 mm in thickness and a lower SBS layer 126B of about 0.1 mm to 2 mm, in one embodiment, 0.3 mm to 0.5 mm, in thickness, such that the total thickness of the compressed mat 126 in one example is about 1.5 to 2.5 mm. When additional layers, e.g., of, e.g., adhesive and release film are added, as described below, the total thickness will increase, in one example to about 2 to 3 mm thickness. These dimensions are merely exemplary and may be varied considerably, e.g., depending upon the strength and weight that is desired/required in the final underlayment product 150 (FIG. 15) and to satisfy the needs or preferences of the consumer. In light of these factors, the total thickness of the underlayment product may vary widely, e.g., from 1.5 mm to 3 mm in total thickness.

An adhesive applying station 128 with applying rolls 128B, 128C and optional doctor blade(s) 129 may be used to apply self-adhering adhesive (SA) 128D held in reservoir 128E to the compressed mat 126 yielding an adhesive coated web 130. In this embodiment, the adhesive is applied only to the back of the compressed mat 126. The adhesive 128D may be prepared on site by combining SBS rubber and asphalt or may be obtained commercially from a variety of sources, e.g., from Crafco, Inc. of Chandler, Ariz. A filler may be added to increase durability. In one exemplary embodiment, the adhesive will have the following weight percentages: about 4% to 8% SBS rubber, about 50% to 60% asphalt of the 150-200 pen type and about 15% to 25% filler in the form of calcium carbonate/limestone.

Figure 13:
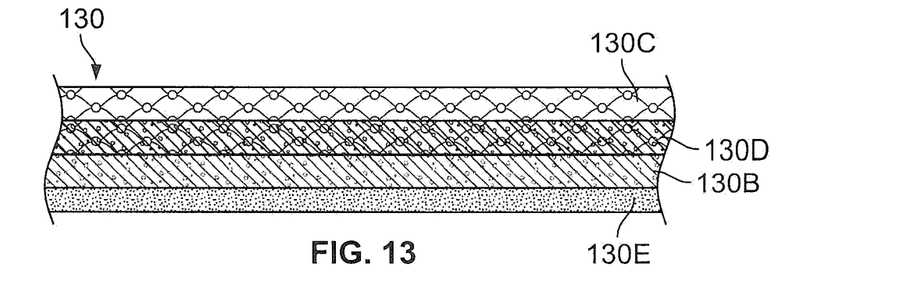
FIG. 13 is a diagrammatic cross-sectional view of the coated mat component of FIG. 12 with an adhesive layer applied in accordance with an embodiment of the present disclosure.

FIG. 13 shows the adhesive coated web 130 having an upper un-infused layer 130C, an infused middle layer 130D, a lower SBS layer 130B, and a bottom adhesive layer 130E, which may cover the entire bottom surface of the adhesive coated web 130.

Figure 14:
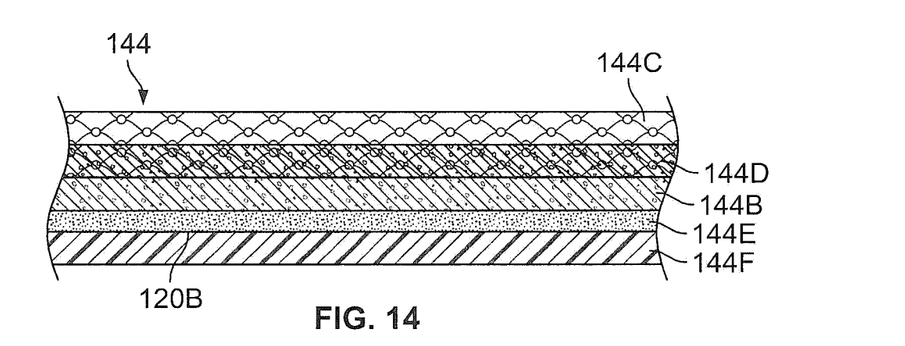
FIG. 14 is a diagrammatic cross-sectional view taken of the coated mat component of FIG. 13 taken along section line 14-14 shown in FIG. 9 and looking in the direction of the arrows, with a release sheet applied in accordance with an embodiment of the present disclosure.

Referring to FIG. 9, after application of the adhesive layer 130E, the adhesive coated web 130 may be cooled by a cooling station 131, such as a water bath 131. A release film application station 134 with application rolls 134A, 134B may be used to apply a split, siliconized, polyethylene bottom release film 136 of about 1.0 to 1.5 mm in thickness to cover the bottom adhesive layer 130E, producing protected, self-adhesive web 144. Siliconized, polyethylene release film is available from a variety of commercial sources, such as Integrated Films of Atlanta, Ga. and is deployed from a bottom film roll 138 and drawn with the adhesive coated mat 132 between the rolls 134A, 134B. As shown in FIG. 14, the protected, self adhesive web 144 has an upper layer 144C of un-infused web, a middle SBS-infused layer 144D, an SBS layer 144B, an adhesive layer 144E and a release film 144F covering bottom adhesive layer 144E.

Figure 15:
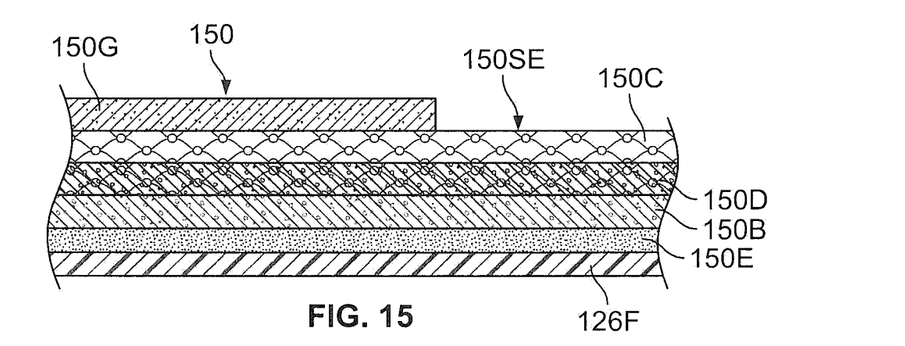
FIG. 15 is a diagrammatic cross-sectional view of the coated mat component of FIG. 14 taken along section line 15-15 in FIG. 9 and looking in the direction of the arrows, with a layer of silicone material applied in accordance with an embodiment of the present disclosure.

Referring to FIG. 9, the protected, self-adhesive web 144 optionally passes over a support/direction change roll 146 and into a silicone coating station 148 with a lower support roll 148B and an upper coating roll 148A that applies a silicone coating 148C to a portion of the upper surface 144C of the self-adhesive web 144 to yield a silicone coated web 150 (FIG. 15). As noted, only a portion of the width of the self-adhesive web 144 is coated with silicone and the portion that remains uncoated forms a selvedge edge 150SE. Since the selvedge edge 150SE is uncoated with silicone coating and may have exposed fibers that are not infused with SBS, it will form a tight bond with an overlaid silicone coated web (underlayment membrane), the adhesive/SBS flowing into and bonding with the upper layer 144C (FIG. 14) of fibrous material.

The silicone coating 148C may infuse into the upper layer 144C, which is not infused with SBS, causing the silicone coating to surround the fibers of the layer 144C, which causes a reinforcement of the silicone coating 148C and an interlocked interface in layer 150G (FIG. 15). The silicone coating 148C may be prepared and applied as described above in reference to the embodiment of FIGS. 1-8, starting with a commercially available moisture-curable silicone coating, such as Eterna-Kote S-100 Silicone Roof Coating available from Sun Paints and Coatings Inc. of Clearwater, Fla. or similar coating from other commercial sources and modifying it for application and rapid curing as described above, resulting in the properties of the coating and underlayment material described above.

As in the previously described embodiment, the silicone coating 148C (FIG. 9) is applied only to the upper surface of the protected, self-adhesive web 144 (FIG. 14) and not on the selvedge edge 150SE. As shown in FIG. 9, an atomizer station 152 with one or more atomizers 152A, 152B, 152C are utilized to spray a mist of water on the web 150 on top of the applied layer 150 (FIG. 15) of silicone coating 148C (FIG. 9), as described above. The atomizers 152A, 152B, 152C mist the silicone coating 148C applied to the web 150 with water in order to speed up the curing reaction of the coating. The curing reaction (polymerization) is catalyzed by water, so therefore a fine water spray is effective at inducing an even and complete cure of the coating 148C. One or more support rolls 154, belts or other support mechanism(s) maintains the position of the silicone coated web 150 relative to the atomizers 152A-C and relative to a drying/cooling station 156 with one or more fans 156A-E. The fans 156A-E will be used to evaporate remaining moisture after the coating curing reaction has been completed. Optionally, an air knife may be used to drive water off the silicone coated web 150.

Additional support/redirecting rolls 158, 160 may be used to adjust the length of the run of the silicone coated web 150 to allow curing of the silicone coating 148C and to deliver the web 150 to a take-up roll/winder 162. Is should be appreciated that the system 110 of FIG. 9 is not to scale and that the distances between elements 114, 118, 124, 128, etc. may be of a different scale that that shown. In one example, the distance from the silicone coating station 148 to the atomizer station 152 is a short distance, e.g., from about 2 to 3 feet to allow the water mist time to cure the silicone coating 148C. In one embodiment, the atomizer station 152 is about 6 to 8 feet long. Given a line speed of about 100-300 ft. per minute, in one example, the coating is misted within 1 to 5 seconds after being applied to the silicone coated web 150 and for a duration of about 5 to 10 seconds or in a line distance of less than 500 ft. at 300 ft./min. or 160 ft. at a line speed of 100 ft./min. This misting results in rapid curing of the coating, e.g., in less than 100 seconds. After misting/curing, the web is driven into the cooling/drying section 156. In this manner, the present disclosure illustrates how a silicone coated web 150 can be produced in a high speed (100 to 300 feet per minute) manufacturing environment. The silicone coating 148C is compatible and binds to the mat 112 material, as well as to SBS.

FIG. 15 shows the silicone coated web 150 in cross-section and featuring an upper layer 150C of un-infused mat, a lower layer 150B of SBS, an infused middle layer 150D, a bottom adhesive layer 150E, a bottom release film 150F covering bottom adhesive layer 150E and a silicone coating layer 150G. The selvedge edge 150SE is uncoated by silicone layer 150G, allowing the open fibers of the un-infused mat 150C to be impressed into and bind with an adhesive layer 150F and/or the SBS layer 150E of an overlying web 150. If the layer 150C is fully infused with SBS, the adhesive layer 150E of an overlying layer will still stick to the selvedge edge 150SE, but will not display the dynamic of interacting with open fibers of layer 150C.

Figure 16:
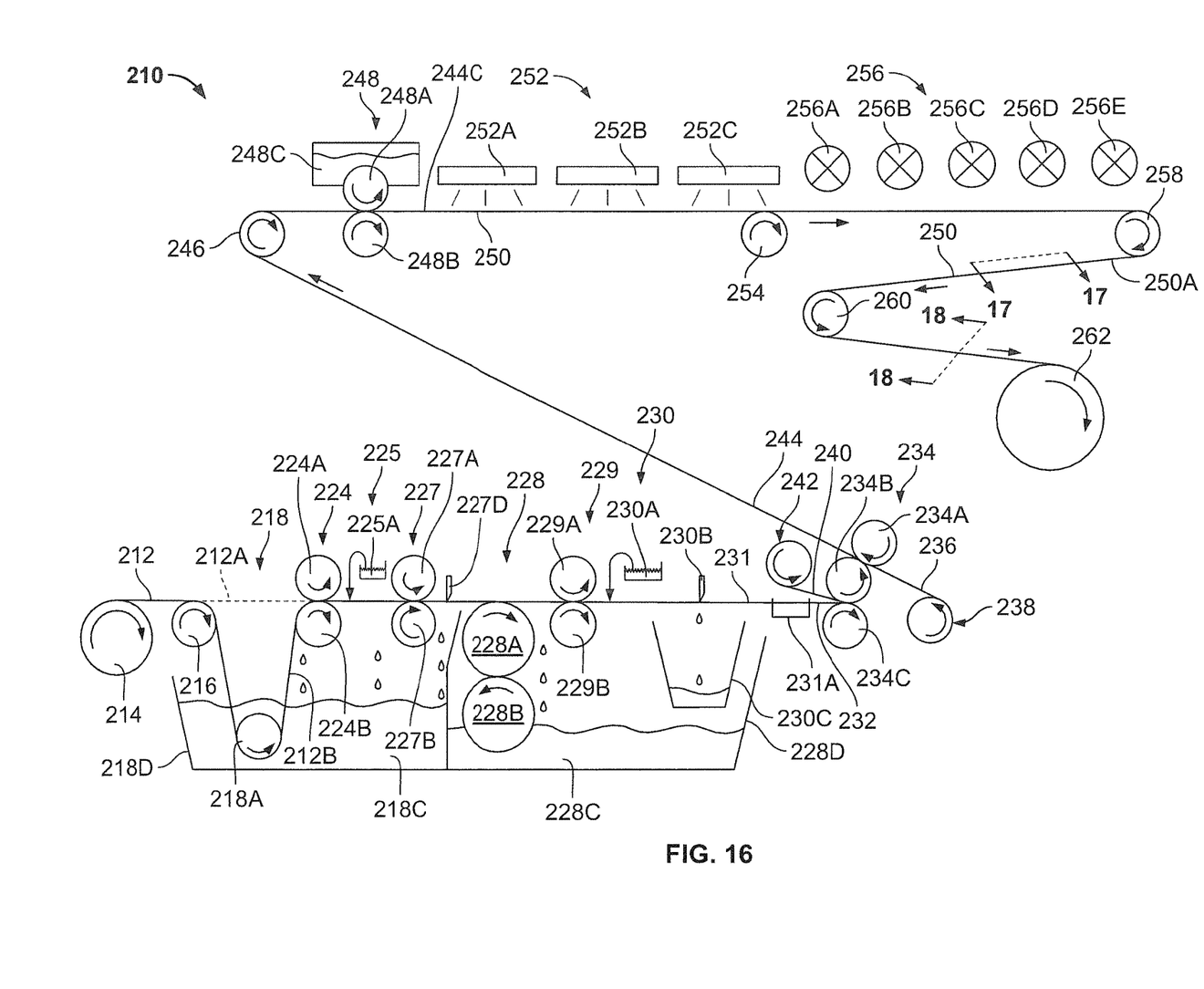
FIG. 16 is a diagrammatic view of an apparatus and process for making a roofing underlayment material in accordance with an alternative embodiment of the present disclosure.
Figure 17:
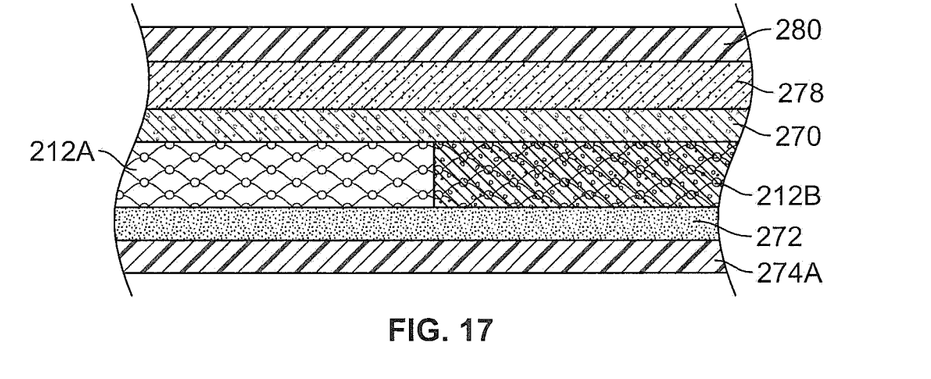
FIG. 17 is a diagrammatic cross-sectional view of an underlayment material in accordance with an embodiment of the present disclosure taken along section line 17-17 and looking in the direction of the arrows.
Figure 18:
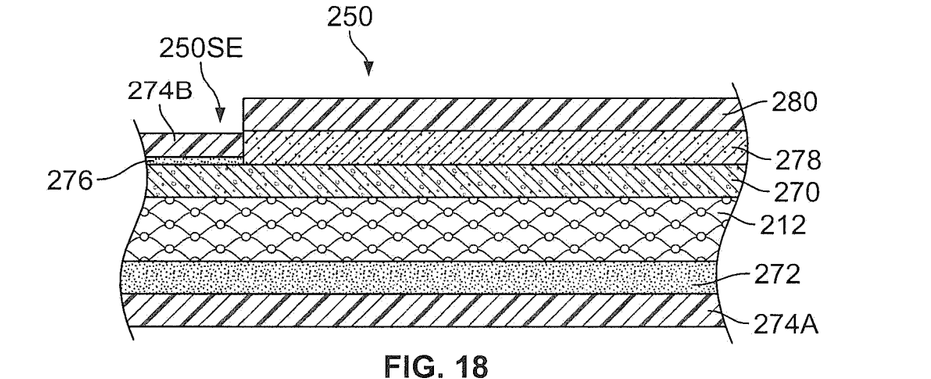
FIG. 18 is a diagrammatic cross-sectional view of an underlayment material in accordance with an embodiment of the present disclosure taken along section line 18-18 and looking in the direction of the arrows.

FIG. 16 shows a manufacturing line 210 for making an underlayment material 250 in accordance with an alternative embodiment of the present disclosure. A woven or felted polyester mat 212, having an initial thickness of about 0.5 mm to 1.6 mm or, in one embodiment, 0.8 mm to 1.2 mm, and a density of about 40 g/m$^2$ to 250 g/m$^2$ or, in one embodiment, 120 g/m$^2$ to 190 g/m$^2$ and a width of about 32 in to 42 in or, in one embodiment, 1 m to 36 in., is withdrawn from a supply roll 214 by the action of one or more rolls 216, 218A, 224A, 224B, 227A, 227B, 228A, 229A, 229B, 234A, 234B, 246, 248A, 248B, 254, 258, 260, 262, which may be driven by an electric motor or the like, and/or turned by the passage of the mat 212 passing there over. FIGS. 17 and 18 show a cross-sectional view of a final underlayment 250 with mat 112A (in unsaturated condition) and 212B (saturated condition). The mat 212, which is essentially the same as that depicted in FIG. 2 and which may be obtained from Johns Manville of Denver, Colo., USA as products identified as spunbond/needle punched and/or glass reinforced mat, or from a variety of other sources. As an alternative to polyester, the mat 212 may be made from other materials, such as fiberglass, a combination of fiberglass and polyester, asphalt saturated felt-paper, polypropylene, polyethylene, or a combination of polypropylene and polyethylene. Some or all of the rolls 216, 218A, 224A, 224B, 2227A, 227B, etc., may be free-wheeling. Rolls, such as support rolls 216 and 254, may be used to support the mat 212 as it travels a distance to the next set of rolls or station, e.g., 218. Rolls 246, 258 and 260 may be used to change the direction of the mat 212, induce advancement of the mat 212 and/or provide tensioning. In addition to rolls, e.g., 216, additional rolls, support belts, tables, etc. (not shown) may also be used in guiding, supporting and handling the mat 212, both at the initial stage and at later stages.

As shown in FIG. 16, the manufacturing line 210 may be operated in different modes. For example, after withdrawal from the supply roll 214, the mat 212 my pass to a styrene butadiene styrene (SBS) modified asphalt coating/saturation station 218 by passing under roll 218A, which draws the mat 212 under the surface of liquefied coating 218C held in reservoir 218D. After saturation with SBS, the mat 212 achieves saturation state 212B. The saturated mat 212B is then passed through squeeze rollers 224A, 224B which conforms the mat 212B to specific dimensions and removes excess SBS material 218C, which drips back into the reservoir 218D.

In the alternative, the mat 212 may bypass the SBS saturation station 218, as indicated by mat portion 212A drawn in dotted lines, and be drawn directly through the squeeze rolls 224A, 224B, such that it is unsaturated by SBS. The foregoing options of saturation or non-saturation of the mat 212 are depicted in the underlayment 250 shown in FIG. 17, where a portion 212A is unsaturated and a saturated version is shown as layer 212B. This is for simplicity of illustration, in that an actual underlayment 250 would typically have one option or the other, but not both. After the mat 212A or 212B passes through squeeze roll station 224, an SBS application station 225 may selectively apply a layer of SBS 225A to the top of the unsaturated mat 212A or optionally the saturated mat 212B. This layer is then dimensioned by calendar rolling station 227 having rolls 227A, 227B that induce excess SBS material 225A to be removed from the top surface of the mat 212A, 212B and drip back into the reservoir 218D. The foregoing step results in a top layer of SBS 270, as shown in FIGS. 17 and 18. Optionally, the top layer of SBS 270 may be scraped by a knife 227D to remove SBS along a width of e.g., 3 inches at one edge of the coated mat 212A/212B to create a recessed selvedge edge. In another alternative approach, the selvedge edge is not scraped. The SBS modified asphalt coating is of a type that is well known in the industry and may be obtained commercially or may be produced on site.

The SBS modified asphalt coating 218C, 225A is kept in a flowable state by maintaining it at a temperature of about 325-380° F.

An adhesive applying station 228 with applying rolls 228A, 228B may be used to apply self-adhering adhesive (SA) 228C held in reservoir 228D to the compressed mat 212A/212B yielding an adhesive coated web. FIGS. 17 and 18 show a layer 272 of adhesive 228C (FIG. 16) on the bottom of the underlayment 250. The adhesive 228C may be prepared on-site by combining SBS rubber and asphalt or may be obtained commercially from a variety of sources, e.g., from Crafco, Inc. of Chandler, Ariz. A filler may be added to increase durability. In one exemplary embodiment, the adhesive will have the following weight percentages: about 4% to 8% SBS rubber, about 50% to 60% asphalt of the 150-200 pen type and about 15% to 25% filler in the form of calcium carbonate/limestone.

Optionally, an adhesive 230A may be applied to the selvedge edge 250SE (FIG. 18) at adhesive applying station 230 and smoothed and dimensioned by blade 230B, excess adhesive 230A dripping off into receptacle 230C. FIG. 18 shows an optional layer 276 of selvedge edge adhesive 230A. In another alternative approach, no selvedge edge adhesive 230A/276 is used, such that the bottom adhesive layer 272 of a first sheet of underlayment 250 adheres to the top layer of SBS 270 at the selvedge edge 250SE.

Referring to FIG. 16, after application of the adhesive 228C and optionally 230A, the adhesive coated web 231 may be cooled by a cooling station 231A, such as a water bath or other cooling apparatus, such as a blower, producing cooled, coated mat 232. A release film application station 234 with application rolls 234A, 234B, 234C (optional) may be used to apply a split, siliconized, polyethylene bottom release film 236 of about 1.0 to 1.5 mm in thickness to cover the bottom adhesive layer 272 and optionally the selvedge edge 250E, producing protected, self-adhesive web 244. Siliconized, polyethylene release film is available from a variety of commercial sources, such as Integrated Films of Atlanta, Ga. and is deployed from a bottom film roll 238 and drawn with the adhesive coated mat 232 between the rolls 234A, 234B. A siliconized, polyethylene selvedge edge release film 240 drawn from selvedge edge film roll 242 may optionally be similarly applied over the selvedge edge 250SE (FIG. 18) and optionally selvedge edge adhesive layer 276 and pressed into position by rolls 234B, 234C, producing protected, self-adhesive web 244. A release layer 274B is shown on the selvedge edge 250SE of underlayment 250 in FIG. 18. The release layer 274B may be used to protect the adhesive layer 276 or the SBS layer 270 at the selvedge edge 250SE, e.g., to prevent debris from sticking at the selvedge edge that would otherwise degrade the bonding and flatness of the overlapping sheet of underlayment 250 at the selvedge edge 250SE. As shown in FIGS. 17 and 18, the underlayment 250 has a release film 274A covering the bottom adhesive layer 272.

Referring to FIG. 16, the protected, self-adhesive web 244 optionally passes over a support/direction change roll 246 and into a silicone coating station 248 with a lower support roll 248B and an upper coating roll 248A that applies a silicone coating 248C to a portion of the upper surface 244C of the self-adhesive web 244 to yield a silicone coated web 250. Only a portion of the width of the self-adhesive web 244 is coated with silicone and the portion that remains uncoated forms a selvedge edge 250SE. Since the selvedge edge 250SE is uncoated with silicone coating, it will form a tight bond with an overlaid silicone coated web (underlayment membrane) 250.

The silicone coating 248C may be prepared and applied as described above in reference to the embodiment of FIGS. 1-8, starting with a commercially available moisture-curable silicone coating, such as Eterna-Kote S-100 Silicone Roof Coating available from Sun Paints and Coatings Inc. of Clearwater, Fla. or similar coating from other commercial sources and modifying it for application and rapid curing as described above, resulting in the properties of the coating and underlayment material described above.

As in the previously described embodiment, the silicone coating 248C (FIG. 16) is applied only to the upper surface of the protected, self-adhesive web 244 and not on the selvedge edge 250SE. As shown in FIG. 16, an atomizer station 252 with one or more atomizers 252A, 252B, 252C are utilized to spray a mist of water on the web 250 on top of the applied silicone layer 278 (FIGS. 17 and 18) of silicone coating 248C, as described above. The atomizers 252A, 252B, 252C mist the silicone coating 248C applied to the web 250 with water in order to speed up the curing reaction of the coating. The curing reaction (polymerization) is catalyzed by water, so therefore a fine water spray is effective at inducing an even and complete cure of the coating 248C. One or more support rolls 254, belts or other support mechanism(s) maintains the position of the silicone coated web 250 relative to the atomizers 252A-C and relative to a drying/cooling station 256 with one or more fans 256A-E. The fans 256A-E will be used to evaporate remaining moisture after the coating curing reaction has been completed. Optionally, an air knife may be used to drive water off the silicone coated web 250.

Additional support/redirecting rolls 258, 260 may be used to adjust the length of the run of the silicone coated web 250 to allow curing of the silicone coating 248C and to deliver the web 250 to a take-up roll/winder 262. Is should be appreciated that the system 210 of FIG. 16 is not to scale and that the distances between elements 214, 218, 224, 228, etc. may be of a different scale that that shown. In one example, the distance from the silicone coating station 248 to the atomizer station 252 is a short distance, e.g., from about 2 to 3 feet to allow the water mist time to cure the silicone coating 248C. In one embodiment, the atomizer station 252 is about 6 to 8 feet long. Given a line speed of about 100-300 ft. per minute, in one example, the coating is misted within 1 to 5 seconds after being applied to the silicone coated web 250 and for a duration of about 5 to 10 seconds or in a line distance of less than 500 ft. at 300 ft./min. or 160 ft. at a line speed of 100 ft./min. This misting results in rapid curing of the coating, e.g., in less than 100 seconds. After misting/curing, the web is driven into the cooling/drying section 256. In this manner, the present disclosure illustrates how a silicone coated web 250 can be produced in a high speed (100 to 300 feet per minute) manufacturing environment. The silicone coating 248C is compatible with and binds to the mat 212 material, as well as to SBS, e.g., layer 270 (FIGS. 17 and 18).

As yet a further option a release sheet layer 280 (FIGS. 17 and 18) may be applied over the silicone coating layer 278 to protect the silicone layer 278, e.g., from dirt or other contamination during manufacture, packaging, storage, transportation to the site of application and application to a building surface. The release layer 280 and the apparatus used to apply the release layer 280 may like that explained above relative to the release layer applying station 234.

As can be appreciated by one of normal skill in the art, the silicone coated web 50, 150, 250 can be utilized by positioning a suitably sized length of the silicone coated web 50, 150, 250 on roof decking. In the instance of a sloped roof, the silicone coated web 50, 150, 250 is oriented with the bottom adhesive positioned proximate to the roof decking with the selvedge edge 50AS, 150SE, 250SE at the higher portion of the roof decking (if sloped). The release film 50G, 150F, 274A is then removed and the bottom adhesive layer 50E, 150E, 272 pressed against the roof decking to form an adhesive bond therewith. Once the first length of silicone coated web 50, 150, 250 is in place on the roof, a second length of silicone coated web 50, 150, 250 may be cut and placed adjacent the first length, with an overlap occurring at the selvedge edge 50AS, 150SE, 250SE. Once in position relative to the first length of silicone coated web 50, 150, 250, the bottom release sheet 50G, 150F, 274A may be removed from the second length of silicone coated web 50, 150, 250, such that the portion of the bottom adhesive 50E, 150E, 272 of the second sheet that overlaps with the selvedge edge 50AS, 150SE, 250SE of the first sheet firmly bonds with the adhesive 50D, 276 on the selvedge edge 50AS, 250SE or with the fibers of the unsaturated layer 150C (or the SBS if the layer 150C is saturated) on the selvedge edge 150SE in the case of the second embodiment, forming a water-tight bond. Optionally, nails or staples can be used to aid in fastening the lengths of silicone coated web 50, 150, 250 to the roof decking, e.g., at the selvedge edge 50AS, 150SE, 250SE. Optionally, the release film 50G, 150F, 274A on the bottom adhesive 50E, 150E, 272 may be divided into a plurality of portions, allowing a first portion to be removed and the length of silicone coated web 50, 150, 250 affixed to the roof decking followed by removal of a second portion. The foregoing process is repeated with overlapping lengths of silicone coated web 50, 150, 250 at the selvedge edge 50AS, 150SE, 250SE until the roof decking is covered with the underlayment.

After covering a roof deck with the silicone coated web 50, 150, 250 underlayment described herein, a top layer of roofing material, such as tiles, or shakes may be applied to cover the underlayment. In another alternative, the underlayment may serve as an exterior roof surface, that is, the underlayment can be used by itself to cover a roof deck in one simple operation, i.e., by adhering the underlayment to the roof decking as described in the paragraphs above. Use of the silicone coated roof material 50, 150, 250 of the present disclosure is facilitated by the possibility of producing it in thin dimensions, which translates into a low weight per square foot ratio of 0.10 lb/ft$^2$ to 1.0 lb/ft$^2$ or, in one embodiment, 0.10 lb/ft$^2$ to 0.55 lb/ft$^2$ The lower the weight of the roof material, the easier it is for workmen to transport the material to a roof and handle it for placement on and attachment to the roof.

An aspect of the present disclosure is the recognition that a roofing underlayment may have multiple purposes and functions, i.e., including the functions of rendering a roof impenetrable to water when used as an underlayment and functioning as a radiation barrier to decrease energy transfer from the environment to inside a building envelope when used as an underlayment or as an exterior finished roofing surface. Increased rejection of heat from the sun translates into reduced cooling costs, e.g., air conditioning costs, particularly in hot, sunny climates. In this regard, the silicone coated web 50, 150, 250 described above demonstrates the following properties: water impermeability <4 perms and initial reflectivity of 0.9. Another aspect of the present disclosure is the identification of an underlayment material that may be manufactured and used with reduced volatile organic compounds (VOCs). More specifically, the underlayment of the present disclosure may be made with VOCs in the range of 0 g/L to 50 g/L.

It will be understood that the embodiments described herein are merely exemplary and that a person skilled in the art may make many variations and modifications without departing from the spirit and scope of the disclosed subject matter and claims. For example, while the modified asphalt coating, e.g., 18D1, 18D2, 118D, 218C, 225A has been described above as being applied to the mat 12, 112, 212 prior to the silicone coating, e.g., 48C, 148C, 248C, the order of application could be reversed. Namely, the silicone coating, e.g., 48C could be applied to the mat 12 prior to the application of the asphalt coating 18D1.

While the asphalt coating, e.g., 18D1 has been described above as containing SBS (styrene-butadiene-styrene), other asphalt modifiers, such as APP (atactic polypropylene), SIS (styrene-isoprene-styrene), SEB (styrene ethylene butylene), SEBS (styrene-ethylene-butylene-styrene) and combinations of homo, block and co-polymers may be used. In another alternative, the asphalt coating, e.g., 18D1 may be unmodified. Each of the foregoing variations may be made in any of the embodiments shown and described above in reference to FIGS. 1-18. All such variations and modifications are intended to be included within the scope of the present disclosure and claims.

We claim:

1. A building material with an upper surface and a lower surface, comprising:
    a support web at least partially infused with asphalt;
    a layer of silicone material applied to the support web infused with asphalt, covering at least a portion of an upper surface thereof and defining a selvedge edge on the upper surface that is not covered by the silicone material, wherein the building material has the following properties: tensile strength MD/CD (psi) 66/30; elongation MD/CD (%) 226/275; density of about 0.97 lbs/yard$^2$; tear strength MD/CD (psi) of 55/85 and adhesion to plywood (plf) of about 28.

2. The building material of claim 1, wherein the asphalt is modified and contains at least one of styrene-butadiene-styrene (SBS), amorphous polypropylene (APP), styrene-isoprene-styrene (SIS), styrene-ethylene-butylene (SEB), styrene-ethylene-butylene-styrene (SEBS) or a combination of homo, block or co-polymers.

3. The building material of claim 1, further comprising a layer of adhesive applied to a bottom surface.

4. The building material of claim 3, further comprising a release sheet removably covering the adhesive on the bottom surface.

5. The building material of claim 1, wherein the support web is made from a fibrous material.

6. The building material of claim 5, wherein the fibrous material includes at least one of polyester, fiberglass, a combination of fiberglass and polyester, asphalt saturated felt-paper, polypropylene, polyethylene, or a combination of polypropylene and polyethylene.

7. The building material of claim 1, wherein the building material has a weight per square foot in the range of 0.1 to 1.0 lbs/ft$^2$.

8. The building material of claim 1, wherein the building material has a weight per square foot in the range of 0.1 to 0.55 lbs/ft$^2$.

9. The building material of claim 1, wherein the asphalt is un-modified.

* * * * *